United States Patent [19]

Sojka

[11] 4,009,685
[45] Mar. 1, 1977

[54] METHOD AND APPARATUS FOR HANDLING WASTES FROM SMALL ANIMAL CAGES

[75] Inventor: Nickolas J. Sojka, Charlottesville, Va.

[73] Assignee: The University of Virginia, Charlottesville, Va.

[22] Filed: June 16, 1975

[21] Appl. No.: 587,306

[52] U.S. Cl. .................................. 119/22; 119/1; 119/28

[51] Int. Cl.² ......................................... A01K 1/01

[58] Field of Search .............................. 119/15–22, 119/27, 28, 1; 252/106; 21/55, 60.5; 424/76

[56] References Cited

UNITED STATES PATENTS

| | | | |
|---|---|---|---|
| 2,523,615 | 9/1950 | Fell | 119/22 |
| 3,107,216 | 10/1963 | Hamilton | 21/55 |
| 3,163,149 | 12/1964 | Ivey | 119/22 |
| 3,552,358 | 1/1971 | Launder | 119/22 |
| 3,762,875 | 10/1973 | Burmeister | 252/106 |
| 3,771,495 | 11/1973 | Stevenson et al. | 119/28 |
| 3,828,732 | 8/1974 | Hill et al. | 119/22 |

Primary Examiner—Louis G. Mancene
Assistant Examiner—Peter K. Skiff
Attorney, Agent, or Firm—Ferris M. Stout

[57] ABSTRACT

An aqueous foam is disposed in a litter tray under an animal cage to receive, conceal, suspend and deodorize animal wastes. When the foam has become soiled, it is cleaned from the tray with a jet or jets of water. The trays may be cleaned in a portable tray washing machine especially adapted for the purpose. A single continuous tray may be provided beneath a multiplicity of cages to receive the aqueous foam, from which the soiled wastes can be flushed by a stream of water into a container for the purpose.

6 Claims, 6 Drawing Figures

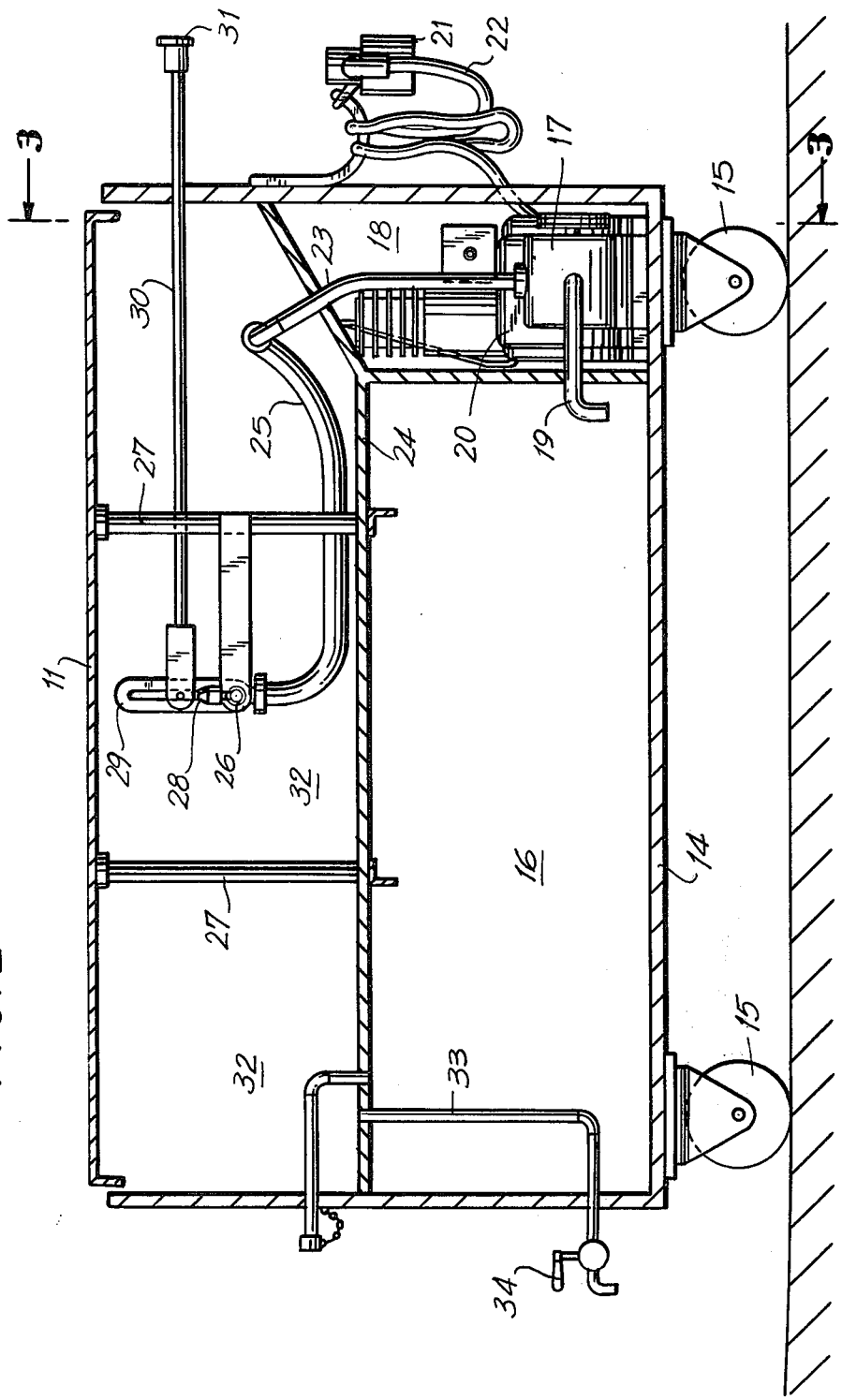

METHOD AND APPARATUS FOR HANDLING WASTES FROM SMALL ANIMAL CAGES

BACKGROUND OF THE INVENTION

1. Field of the Invention

The present invention relates to a method and apparatus for handling animal wastes from animals kept in cages with perforate bottoms.

2. Description of the Prior Art

When small animals are kept in cages in which the animals are not in contact with bedding, but rather are housed upon a wire mesh or otherwise perforate floor, animal wastes drop through the floor and into a litter tray beneath the cage which can be removed for cleaning. For hygenic and aesthetic reasons a substance is provided in the tray which will absorb or suspend liquid wastes and deodorize both liquids and solids, and which can be disposed of when soiled. Many bulk litter materials have been tried and have been used for this purpose, among them being shredded alfalfa, shredded aspen, shredded peat moss, wood shavings, and the like. Although these materials are absorbent, they are bulky, messy to handle, and often constitute a fire hazard in storage. Moreover, depending on the economic situation of the moment, they are often either expensive or unobtainable. Disposal of the solied litter, which often constitutes a considerable bulk, can be expensive, particularly in a vivarium. Soiled wastes are often imperfectly suspended in the solid litter. When the tray is emptied, some of the waste remains smeared on the tray. The next batch of litter will then be inoculated with oder-causing bacteria. To prevent this happening, each set of trays is commonly washed in a separate, remote facility, while clean trays from a second set are installed in the cages.

Commercial substitutes have been offered for the bulk litter recited above. One is a fibrous pad impregnated with substances which control odors and bacteria. Though easier to handle than bulk litter, the pads are relatively expensive, and they do not solve the disposal problem. Another substitute for bulk litter is a liquid. Although it controls odor and bacteria, the liquid tends to slosh and spill out of the tray when the tray is removed from the cage.

Come configurations of animal cages provide for a continuous litter tray extending beneath a row of individual cages, and in some cases the manure-receiving trays are slanted to allow stacking of the cages and mechanical scraper blades are provided to push the manure to the end of the tray. Other arrangements provide reciprocating scraper apparatus with cutoff limit switches for cleaning the trays. However, mechanical scrapers inevitably leave a film of semi-dry manure stuck to the litter tray beneath the cages. This film or residue is an ideal culture medium for bacteria, which, being ever present in the tray, inoculate each successive load of manure, thereby generating noxious odors, particularly ammonia, often to the extent of causing poor growth or production by the caged animals.

SUMMARY OF THE INVENTION

The present invention relates to a new and improved method and means for handling the wastes from small animal cages.

An object of the invention is to provide a new and improved method and apparatus for treating wastes produced by caged animals.

In place of solid fibrous litter, a long-lasting, aqueous foam is provided in the litter tray. The foam has the property of closing over the hole which an object or splash of liquid dropped into it makes: that is to say, the hole "heals", so that a continuous, relatively air-tight surface of foam covers the tray surface. Pieces of solid waste and splashes of liquid waste are thereby largely sealed from the atmosphere: objectionable odors cannot escape, and the shortage of oxygen at the surface of the waste strongly inhibits the growth of microorganisms and the processes of decomposition which cause odors.

When the foam has become soiled with animal wastes, it is readily disposed of by flushing the soiled foam from the litter tray into a suitable receptable or into the sewer with a jet of water. A typical foam has an expansion of as much as twenty to one: that is to say, the foam is composed of nineteen volumes of air and one volume of foam composition. A small-volume jet of relatively high pressure water suffices to flush the foam from the litter tray and to collapse the foam. When many cages are cleaned, the volume of the refuse-bearing foam is therefore relatively manageable: its volume is many times less than the volume of the solid, fibrous type litter. Moreover, the refuse can be readily disposed of in any convenient sewer, whereas solid, fibrous type litters must be carted away from the premises to a suitable disposal site, often at considerable expense.

The present invention, as well as further objects and features thereof, will be more fully understood from the following description of a preferred embodiment, when read with reference to the accompanying drawings.

BRIEF DESCRIPTION OF THE DRAWINGS

FIG. 2 is a side elevational view of a litter tray washing machine useful with animal cages in accordance with an embodiment of the invention.

DESCRIPTION OF CERTAIN PREFERRED EMBODIMENTS

Discrete Litter Tray

Figure 1:
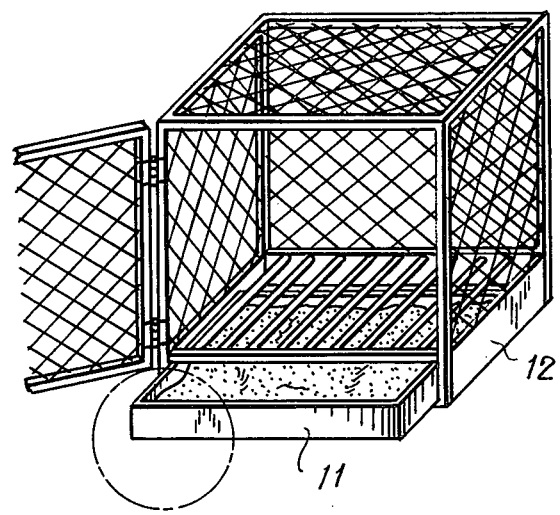
FIG. 1 is a perspective drawing of a typical small animal cage. The litter tray is shown partly withdrawn.
Figure 1A:
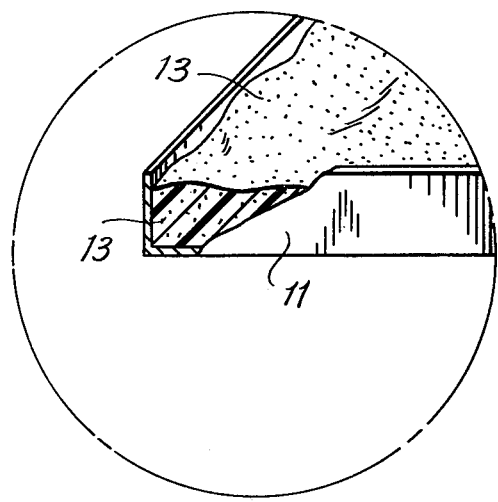
FIG. 1A is a fragmentary perspective view of a portion of the apparatus shown in FIG. 1.

In the accompanying drawings,

FIG. 1 is a perspective view of a typical small animal cage. 10 is the slatted floor of the cage. 11 is a rectangular litter tray, containing aqueous foam, shown partly withdrawn from the aperature in which it slides, formed by extensions 12 of the sides of the cage. FIG. 1-A is a magnified view of a corner of the tray 11 shown with a portion of the front edge cut away to show the foam 13 in the tray.

In FIG. 2 the side of the tray washing machine facing the observer is shown removed to illustrate the interior. The tray washing machine comprises a cabinet with spray apparatus mounted upon a wheeled frame. Stainless steel is used for construction. In other embodiments aluminum may be used. Steel may be used if adequately protected from corrosion. The frame 14 of the tray washing machine is supported by castors 15. Compartment 16 is a reservoir for rinsing water from which pump 17, in compartment 18, draws its intake through pipe 19. Pump 17 is driven by a motor (not shown) which is controlled by a switch and timer circuit (not shown) so that when the switch is activated, the pump will run for a preselected time and turn off. Compartment 18 also contains an air compressor and tank 20, to which a foam gun 21 is attached by hose 22. The foam gun comprises a receptacle for foam composition, a foam nozzle, and a valve for actuating it. (In another embodiment, the air compressor may be replaced by a foam generator, such as the device sold by Waukesha Foundry Company, Inc., 1300 Lincoln Ave., Waukesha, Wisconsin, 53186. In yet another embodiment, the foam generating means may be pressurized containers, such as shaving foam containers, separated entirely from the tray washing machine.)

Pump 17 delivers rinsing water through pipe 23 which penetrates, and is externally sealed to, divider 24, and through flexible hose 25, to manifold 26. Manifold 26 is rotatably mounted to the sides of tray supports 27, shown supporting tray 11 in an inverted position. Spray nozzles 28 are installed on manifold 26, facing upwards. Arm 29, which is fixed to manifold 26, has a longitudinal slot to which shaft 30 is pivotably connected. When hanlde 31, attached to the other end of shaft 30, is moved laterally, manifold 26 rotates through an arc, so that spray from nozzles 28 covers the interior surface of inverted tray 11.

Compartment 32 receives wastes and collapsed foam flushed from inverted tray 11. Pipe 33 and valve 34 provide means for draining compartment 32.

Figure 3:
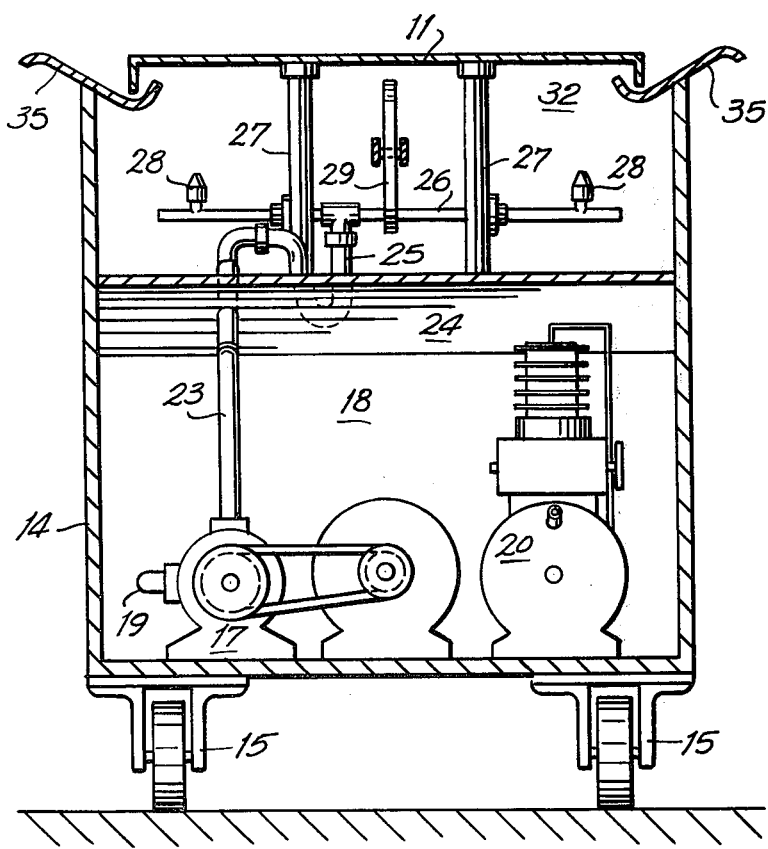
FIG. 3 is a section taken along the line 3—3 of FIG. 2.

In FIG. 3 the location of the spray nozzles 28 can be readily seen. Upper edges of the sides of the tray washing machine are equipped with brackets 35 to receive a side of tray 11.

In another embodiment, trays are rinsed into the same compartment which provides intake to pump 17, thereby eliminating the need for a separate compartment, but necessitating provision of a screen for pump inlet pipe 19.

To use the tray washing machine, the operator fills compartment 16 with rinse water (which may contain a small amount of silicone foam collapsing compound), wheels it to the site of the animal cages to be cleaned, and plugs its power cord into an electrical outlet. He withdraws a litter tray, with its load of soiled foam, from an animal cage, and rests its long side on the brackets 35. Using the brackets for support he inverts the tray, resting it on tray supports 27, activates the switch controlling the pump motor, pulls out handle 31 and pushes it back in. After the pump motor stops, he turns the tray right side up on the tray supports 27, and with the foam gun 21, refills the tray with clean foam. He replaces the tray in its cage and proceeds to the next one. When a number of trays has been cleaned, he pushes the tray washing machine to a sewer drain and, by opening valve 34, empties compartment 32 into the sewer.

Continuous Litter Tray

Figure 4:
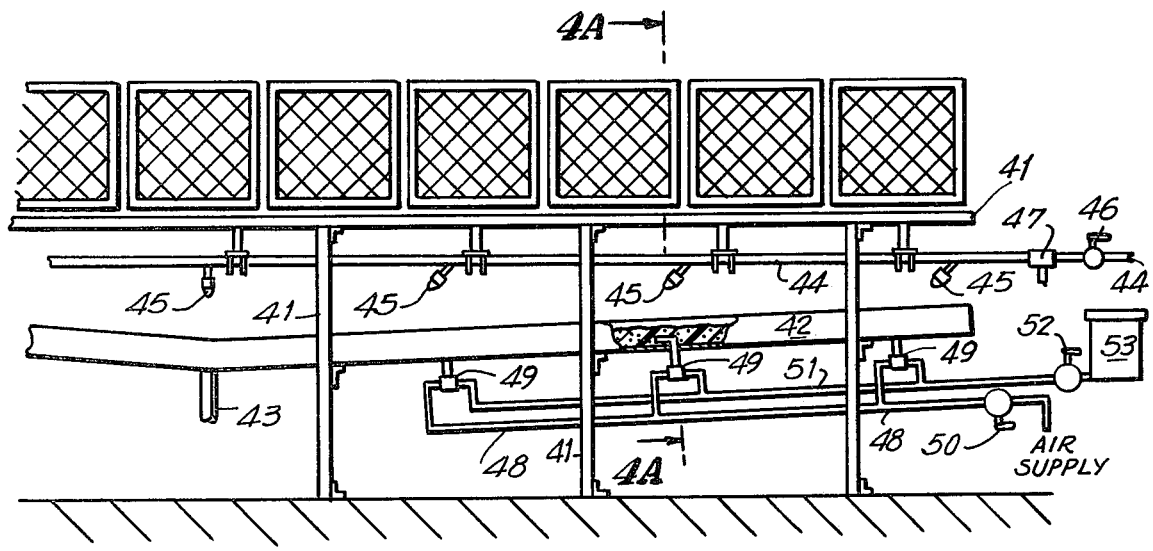
FIG. 4 is apartially schematic side elevational view showing a row of animal cages set upon a rack in accordance with another illustrative embodiment of the invention.
Figure 4A:
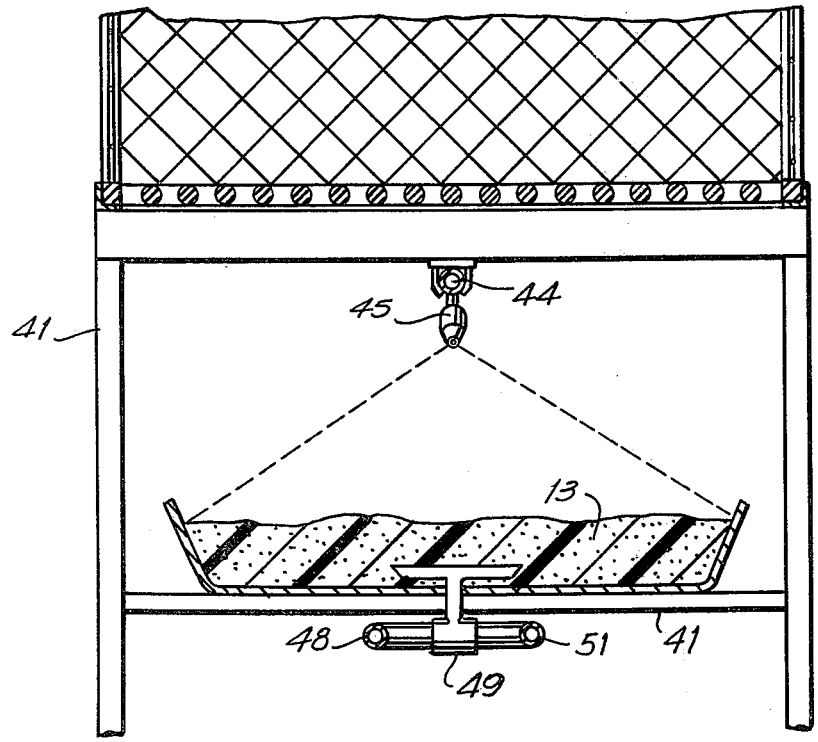
FIG. 4A is a sectional view taken along the line 4A—4A.

In FIG. 4, a plurality of animal cages 40 are shown mounted on a rack 41 above a continuous litter tray 42, also supported by rack 41. Tray 42 is pitched to drain through drain pipe 43.

Three manifolds are associated with tray 42. Manifold 44 is attached to rack 41 beneath the cages and above the tray. Spray nozzles 45 in the manifold are directed into the tray. The end of manifold 44 is connected to a water supply line through valve 46. Just downstream of valve 46 an aspirator 47 is installed in the manifold and connected to a supply of silicone foam-killer.

Beneath the tray and supported by rack 41 upon which it rests, manifold 48 is connected to foam nozzles 49 which are installed down the length of the tray in the center of its bottom. The end of manifold 48 is connected to a source of compressed air (not shown) through valve 50.

Also beneath the tray and similarly supported, manifold 51 is connected to the same foam nozzles 49. The end of manifold 51 is connected through valve 52 to a supply of foam composition (53).

In another embodiment, a single manifold is provided beneath the tray, connected to foam outlets (which must be larger than foam nozzles 49), the other end being connected to a foam generating machine such as that provided by Waukesha Foundry Company. Foam composition, in this embodiment, is fed directly into the foam generator and expanded into foam. The foam is pumped by the foam generator down the manifold and out of the foam outlets into the tray. In yet another embodiment, foam generating means and foam composition is provided on a portable cart. The operator draws the cart the length of the tray, filling it with foam by means of a hose connected to the foam generating means.

The preferred embodiment of aqueous foam in a continuous tray is used as follows. The operator opens valve 46, providing water containing foam killer drawn through aspirator 47 to spray nozzles 45. Spray from the nozzles collapses the foam and flushes the load of waste down tray 42 and out drain pipe 43. When the tray is clean and empty, the operator shuts valve 46, stopping the spray. He then opens valve 50 supplying air to manifold 48, and opens valve 52, allowing foam composition to flow through manifold 51. Air pressure at the foam nozzles makes foam and extrudes it through the nozzles to fill the tray with clean foam. Since the tray is wet from the previous cleaning, foam from one nozzle tends to slide down the tray until it encounters foam from the next nozzle, so that a flat, continuous bed of foam is left in the tray.

The Foam Composition

In a preferred embodiment it is important that the foam provided be stiff and long-lasting in the environment in which it is used. Certain foam compositions useful at low temperatures e. g. for insulating crops from frost, will collapse at temperatures of 70° F and above, such as exist where small animals are caged. Though not to be construed as limiting of the invention, foam compositions found to be useful with this invention, comprise mixtures of water, sorbitol, a fatty acid, a polyhydric alcohol, and an amine. The following formulation represents a particularly good formulation in this situation:

First, mix the following ingredients, heat the mixture to 200° F, and hold the mixture at that temperature:
    218 lb. of water
    29.25 lb. of sorbitol 19.35 lb. of triethanol amine.

Next, separately mix and heat unitl all dissolves:

18.50 lb. of stearic acid, thrice processed
7.75 lb. of cocoanut oil

Finally, combine the first mixture with the second, mix them thoroughly, and cool. When cool, add:

8.75 lb. of water, and
8.75 lb. of propylene glycol.

This formula makes 310 pounds, or about 35 gallons of foam composition, sufficient to generate 100 cubic feet of stiff, long-lasting foam when intermixed with gas or air. The formulated composition is made and sold by Skyline Industries, Inc., Route 29 North, Charlottesville, Virginia 22901.

The terms and expressions which have been employed are used as terms of description and not of limitation, and there is no intention in the use of such terms and expressions of excluding any equivalents of the features described or portions thereof, it being recognized that various modifications are possible within the scope of the invention.

What is claimed is:

1. In an animal cage in which a litter tray is provided to receive animal wastes, a method for treating the wastes, which comprises the steps of
    disposing a semi-solid, long-lasting aqueous foam in the litter tray for a period of time sufficient to receive wastes from an animal in the cage, and
    removing the aqueous foam from the litter tray by means comprising jets of water when the aqueous foam has become soiled.

2. The method of claim 1 which further comprises the step of
    cleaning the aqueous foam from the litter tray in a portable tray washing machine in which jets of water are directed against the litter tray, and collecting the contents of the litter tray in a compartment in the tray washing machine.

3. In an installation of a plurality of small animal cages disposed side-by-side beneath which a continuous litter tray receives animal wastes, a method for treating the wastes which comprises the steps of
    disposing a semi-solid, long-lasting aqueous foam in the litter tray for a period of time sufficient to receive wastes from the animals in the cages, and
    flushing the litter tray with a stream of water so that the aqueous foam flows into a container.

4. In an installation of a plurality of small animal cages disposed side-by-side beneath which a continuous litter tray receives animal wastes, the improvement which comprises
    means disposed along the length of the litter tray for filling the litter tray with a semi-solid, long-lasting aqueous foam, and
    means disposed along the length of the litter tray for flushing the semi-solid, long-lasting aqueous foam from the litter tray.

5. In combination,
    a litter tray for an animal cage,
    means for applying a semi-solid, long-lasting aqueous foam to the litter tray in a thickness sufficient to envelop waste falling on the foam from animals positioned in the cage above the litter tray, and
    means for washing the foam from the litter tray.

6. In combination,
    a litter tray removably installed in an animal cage, and
    aqueous waste-receiving foam disposed in the litter tray in a layer between one half inch and two inches deep, the foam comprising air, water, sorbitol, a fatty acid, a polyhydric alcohol, and an amine.

* * * * *